(12) United States Patent
Spittle

(10) Patent No.: US 9,936,651 B2
(45) Date of Patent: Apr. 10, 2018

(54) NETLESS FIBER MULCH MATS BOUND WITH BICOMPONENT FIBERS

(71) Applicant: Profile Products L.L.C., Buffalo Grove, IL (US)

(72) Inventor: Kevin S. Spittle, Vero Beach, FL (US)

(73) Assignee: PROFILE PRODUCTS, L.L.C., Buffalo Grove, IL (US)

( * ) Notice: Subject to any disclaimer, the term of this patent is extended or adjusted under 35 U.S.C. 154(b) by 995 days.

(21) Appl. No.: 13/926,114

(22) Filed: Jun. 25, 2013

(65) Prior Publication Data

US 2013/0298458 A1    Nov. 14, 2013

Related U.S. Application Data

(63) Continuation of application No. 10/957,785, filed on Oct. 4, 2004, now Pat. No. 8,567,117.

(51) Int. Cl.
*A01G 13/02*    (2006.01)

(52) U.S. Cl.
CPC ................................ *A01G 13/0268* (2013.01)

(58) Field of Classification Search
CPC ................................................. A01G 13/0268
USPC ......................................................... 47/9, 56
See application file for complete search history.

(56) References Cited

U.S. PATENT DOCUMENTS

| | | |
|---|---|---|
| 2,757,150 A | 7/1956 | Heritage |
| 5,017,319 A | 5/1991 | Shen |
| 5,302,445 A | 4/1994 | DePetris et al. |
| 5,330,828 A | 7/1994 | Jacobsen, Jr. et al. |
| 5,484,501 A | 1/1996 | Jacobsen, Jr. et al. |
| 5,779,782 A | 7/1998 | Spittle |
| 6,156,682 A | 12/2000 | Fletemier et al. |
| 6,360,478 B1 | 3/2002 | Spittle |
| 6,446,386 B1 | 9/2002 | Holloway |
| 6,589,892 B1 | 7/2003 | Smith et al. |
| 6,681,521 B1 | 1/2004 | Holloway |
| 6,729,807 B1 | 5/2004 | Spittle |
| 2003/0060113 A1 | 3/2003 | Christie et al. |
| 2005/0246950 A1 | 11/2005 | Girard et al. |

FOREIGN PATENT DOCUMENTS

| | | |
|---|---|---|
| EP | 0 161 766 | 11/1985 |
| EP | 492 016 | 7/1992 |
| FR | 2828114 A1 | 2/2003 |
| WO | 2004014122 A1 | 2/2004 |

OTHER PUBLICATIONS

Acc@pta, "Material Safety Data Sheet," Jan. 6, 2004.
Wu, "Polyacrylamide (PAM)—Effective Erosion Fighter and Infiltration Enhancer but not a conserverver of water," Spring 2001.

*Primary Examiner* — Son T Nguyen
(74) *Attorney, Agent, or Firm* — Brooks Kushman P.C.

(57) ABSTRACT

Natural fiber mulch mats are prepared from natural fibers, bicomponent fibers, and optionally other synthetic fibers, and consolidated at a temperature sufficient to melt a lower melting polymer of the polymers used to prepare the bicomponent fiber. The mulch mat may be prepared without conventional binders and without a polymer netting, yet exhibits good handling properties and superior water holding properties as compared to melting-containing products, without the drawbacks of the latter.

20 Claims, 3 Drawing Sheets

NETLESS FIBER MULCH MATS BOUND WITH BICOMPONENT FIBERS

CROSS-REFERENCE TO RELATED APPLICATIONS

This application is a continuation of U.S. application Ser. No. 10/957,785 filed Oct. 4, 2004, (now pending), the disclosure of which is incorporated in its entirety by reference herein.

BACKGROUND OF THE INVENTION

1. Field of the Invention

The present invention is directed to netless fiber mulch mats, to a process for their preparation, and to their use.

2. Background Art

Fiber mulch mats are in widespread use in preventing soil erosion and to aid in germination of seed beds. The fibers in such mats, also termed turf reinforcement mats ("TRM") may be derived from numerous organic sources, including wood fibers, straw, jute, sisal, coconut, and paper. Due to its ready availability, wood fibers are preferred for such products.

Fiber mulch mats must possess satisfactory physical characteristics which are often conflicting. For example, the mats should aid in water retention when used to aid seed germination, yet must be open enough to allow seedlings to penetrate the mat. The mats must also be of sufficient strength to be handled effectively during installation over soil and/or seedbeds, and must retain their integrity over extended periods while exposed to the elements. Otherwise, their ability to control run-off, and hence erosion, would be rapidly lost.

In the past, fiber mats have been bound together with the aid of numerous organic binders, both natural and synthetic. Natural binders include starches, vegetable gums, and the like, including chemically modified celluloses such as hydroxyethyl cellulose, hydroxypropyl cellulose, carboxymethyl cellulose, and the like. Such natural or chemically modified natural binders suffer from the defect of rapid degradation due to exposure and to the action of microorganisms. Synthetic polymeric binders such as styrene-butadiene latexes, polyacrylates, polyacrylamides, acrylic acid/acrylamide copolymers, polyvinylacetate, polyvinylacetate-ethylene copolymers, phenolic resins, and the like have also been used. Such polymer-based binders are generally more expensive than natural binders, and many share at least modest water solubility or swellability, which decreases the binding capability and hence strength of the product over time following installation. Even directly after manufacture, such products frequently exhibit deficient strength properties.

In U.S. Pat. No. 5,779,782, binding of spray-applied fiber mulch mats is improved by the incorporation of crimped synthetic fibers which serve to entangle with other crimped synthetic fibers and natural fibers to increase the integrity of spray applied mats while employing less or no binder. In U.S. Pat. No. 6,360,478, it is proposed to employ permanently crimped natural fibers for a similar purpose. No preformed mats are disclosed, however, and the degree of entanglement of either natural or synthetic fibers, without the use of a binder, is not believed possible to formulate a mat with adequate tear strength or tensile strength.

In U.S. Pat. Nos. 5,779,782, 5,330,828 and 5,484,501, it is proposed to employ low melting organic polymer fibers together with natural mulch fibers. The mat is preferably air laid, and passes through a heated embossing roller which melts portions of the organic fibers, thus binding together the mulch fibers. However, in this process, the strength-imparting properties of the polymer fibers is substantially lost, and the addition of further high melting fibers is suggested to overcome this deficit. Such mats also possess less than the desired degree of tensile strength and tear resistance.

All the foregoing mat products suffer from a lack of tensile and tear strength, and thus it has been proposed to further incorporate fiber netting to increase these characteristics, as taught, for example by U.S. Pat. No. 5,302,445. The netting is preferably of low melt temperature polypropylene, and is sandwiched between two fibrous mulch mats. Upon being calendared between heated rollers, the net serves both as a binding aid as well as a reinforcing aid. However, the primary binding of the mulch fibers is accomplished with the aid of conventional natural or synthetic binders such as starch or phenolic resin. A typical binder-bound, polymer net-containing product of the prior art is illustrated in FIG. 1, where the wood fibers 2 of the mulch mat 1 are intertwined and bound by a binder which is not apparent in this view since it generally is applied as a solution or a dispersion of very fine particles in the nature of wood glue, and binds the wood fibers 2 where they touch each other. The polymer netting 3 further secures the wood fibers and renders the mat tear resistant.

Mats containing polymer netting are sometimes undesirable. First, portions of the netting, due to exposure, particularly to UV light, may lose their strength rapidly, while other portions which become encased in soil and sediment may persist for many years, resulting in an environmentally undesirable contaminant. Such netting is also susceptible to entanglement by animal traffic, which may result in tearing or displacement of the mat, or the ensnaring of small animals, and to damage by equipment such as lawn mowers and the like. Commercial products may also exhibit less than adequate water holding capacity, as well as lesser ability to conform to the terrain due to the increase in stiffness provided by the netting. Close contact with ground contours is desirable to reduce run-off and soil erosion.

It would be desirable to provide a mulch mat consisting largely of natural fibers which possesses adequate strength properties without the use of netting, the properties of which are enduring even when exposed to the elements and microorganisms. Such a product should be economical to manufacture, and should possess the characteristics desirable for seed bed establishment and/or erosion control. It would be further desirable to produce such a mulch mat with no or little natural or synthetic binder.

SUMMARY OF THE INVENTION

It has now been discovered that natural fiber mulch mats of good handleability, tear, and tensile strength can be produced by binding natural mulch fibers with a minor quantity of bicomponent synthetic fibers having a high melting core and a low melting sheath, under heat and/or pressure. The mulch mats thus produced exhibit initial properties similar to mulch mats bound by other binders, may be netless, and yet retain considerable strength and integrity over more extended periods than other mulch mat products. The mats also exhibit greater water holding capacity than polymer netting-containing mats and mats held together only by binders.

DETAILED DESCRIPTION OF THE PREFERRED EMBODIMENTS

Figure 1:
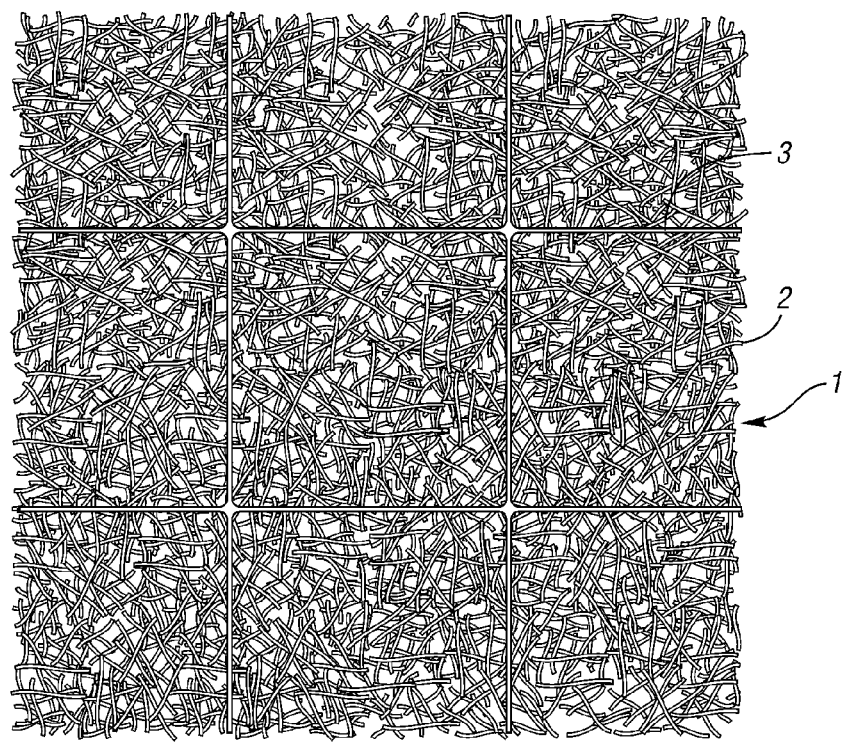
FIG. 1 illustrates a typical prior art chemically bound mat having a polymer netting.

The fiber mulch mats of the present invention comprise in excess of 50% by weight of natural fibers, preferably in excess of 60% by weight, more preferably from 70 to 95% by weight, and most preferably from 75 to 90% by weight. The mulch mats also contain synthetic fibers in an amount of about 3% to about 30% by weight, more preferably from 5 to 25% by weight, and most preferably from 5-20% by weight. The nature of the synthetic fibers will be discussed in detail hereafter. At least a portion of the synthetic fibers are bicomponent fibers. The mulch mats may also contain natural and/or synthetic binders, water absorbents, dyes and/or pigments, fertilizers, seeds, etc.

The preferred natural fibers are wood fibers, preferably with mean (number average) lengths of from 0.125 inch (ca. 2 mm) to 1 inch (25 mm), more preferably 0.25 inch (6 mm) to ¾ inch (19 mm). However, suitable natural fibers include any available or which can be made available in the requisite lengths, advantageously with an aspect ratio greater than 5, preferably with an aspect ratio of at least 10, more preferably at least 15, and most preferably at least 20. Suitable fibers include fibers of coniferous and deciduous woods, cotton, wool, flax, jute, coconut, hemp, straw, grass, and other fibers available directly from natural sources, as well as chemically modified natural fibers, for example chemically modified cellulose fibers, cotton fibers, etc. Suitable natural fibers also include abaca, cantala, caroa, henequen, istle, Mauritius, phormium, bowstring, sisal, kenaf, ramie, roselle, sunn, cadillo, kapok, broom root, coir, crin vegetal, and piassaua. These lists of natural fibers are illustrative and not limiting. Examples of chemically modified fibers also include azlon (regenerated natural proteins), regenerated cellulose products including cellulose xanthate (rayon), cellulose acetate, cellulose triacetate, cellulose nitrate, alginate fibers, casein-based fibers, and the like.

The natural fibers may be prepared by any convenient manner, for example as disclosed for wood fibers in U.S. Pat. No. 2,757,150, herein incorporated by reference, in which wood chips are fed to a pressurized steam vessel which softens the chips. Any type of wood chip may be used, but wood chips of the soft hardwood varieties, such as yellow poplar and particularly, pine, are preferred. A defiberator mechanically separates and sizes the chips into individual fiber bundles. The fibers are generally classified prior to use. The use of thermo-mechanical wood fibers yields several advantages. First, the wood fibers are highly hygroscopic in nature and allow the mat to absorb moisture immediately upon contact with water. This results in reduced water run-off on a project site which improves percolation into the soil surface and minimizes erosion as well as improving seed germination and growth by increasing the amount of water available for plants. Secondly, thermo-mechanical wood fibers are of a fine denier, and are shorter in length. This allows for a more supple mat product and also for the formation of a more uniform mat in both thickness and density. When the mat product is wet, it conforms much better to irregular terrain, which assists in eliminating the gap between the bottom surface of the mat and the soil. The ability to conform to the terrain acts to trap the soil and seed bed which results in much less sediment and seed bed loss. Once the mat product is dry, the mat retains its new shape with virtually no recovery. Thirdly, the wood fibers tend to entangle with thermoplastic fibers within the mat substrate, adding to the mat's strength in all directions, and thereby improving the handability of the product without requiring netting. Of course netting may be added to the mat product for maximum strength, but this is undesirable except where such strength properties are necessary.

The natural fibers may also include crimped natural fibers, preferably permanently crimped natural fibers as disclosed in U.S. Pat. No. 6,360,478, herein incorporated by reference. The natural fibers preferably are not simply mechanically crimped, as purely mechanical crimping, for example between partially intermeshing toothed rollers, creates a crimped product which is incapable of retaining the necessary set following application, particularly in high humidity or wet (i.e., rain) environments. Rather, it is preferable that crimping be performed at a temperature which is such to cause thermal (i.e., plasticization) or chemical (i.e., cross-linking or degradation into adhesive-like decomposition products) changes which cause the crimp to be maintained even in the presence of light and moisture. In some cases, the fibers may be treated with a coating or impregnant which allows the fibers to retain their set without modification of the fibers per se. Examples of such coatings are methylolurea resins, phenol formaldehyde resins, melamine formaldehyde resins, urea formaldehyde resins, furfural-derived resins, and the like. Many of these resins are commercially available, and are used as binders, for example in fiberglass products, or in fabric treatment to bestow anti-wrinkle performance. In the present case, the coatings are applied and cured before, during, or after the crimping operation, to make permanently crimped fibers as opposed to their normal use in keeping fibers straight (i.e., in wrinkle free fabrics). These resins, due to their thin coating and chemical content, are themselves biodegradable. Some of the resins perform a fertilizing function as they degrade over time, i.e., melamine-formaldehyde, urea-formaldehyde and urea-melamine-formaldehyde resins. Other resins, e.g., epoxy resins, novolac resins, etc., may also be used. However, they are, in general, less biodegradable than the resins previously identified, as well as being more expensive.

Thus, when crimped natural fibers are desired, the fibers may be heat and/or steam treated, or may be crimped prior to cure of a curable coating and/or impregnant, or may employ a combination of such techniques, to create a permanently crimped fiber. Chemically modified natural fibers such as cellulose acetate cellulose triacetate, and cellulose nitrate may be crimped at, above, or near their softening point. Unmodified lignocellulosic fibers such as cotton, flax, wool, etc., must in general be heated to relatively high temperatures, often in the presence of moisture (i.e., superheated steam) to, for a time sufficient to partially break down some of the lignocellulosic or proteinaceous components.

Wood fibers, for example, and those of jute and coconut, may be heated in a moist atmosphere to a temperature and for a time where the fibers turn from golden brown to dark brown and are then crimped. Under these conditions, a natural adhesive is formed as a degradation product, as taught by U.S. Pat. No. 5,017,319 and European Patents EP 0 161 766 and EP 492 016, herein incorporated by reference. Fibers crimped in this condition and then cooled, will have a set which allows the crimps to be maintained over an extended period of time, even in the presence of moisture.

The crimping conditions vary with each type of fiber, its source, and its method of preparation. Finding suitable crimping conditions is straightforward, however, and involves, for natural fibers without coatings, passing the fibers through crimping devices at various temperature and moisture levels, and testing for permanent crimp by exposing the crimped fibers to a warm, high, humidity environment. For example, the fibers may be placed in a metal tray in an environmentally controlled oven and periodically sprayed with a mist of water. Fibers which maintain their ability to interlock following such exposure have been treated successfully, assuming the mulch product containing these crimped fibers is to be dry-applied. For mulch products to be applied from mulch tanks, the fibers should be first immersed in water and agitated 15 minutes prior to testing as above.

When a coating and/or impregnant is used, the fibers may be crimped mechanically and then sprayed with a solution or dispersion of the coating/impregnant material, or may be first contacted with the solution or dispersion and then crimped. In either case, the crimping and coating operations must be consolidated such that a crimped product containing a coating or impregnated with a cured resin is obtained. For example, crimped fibers may be transported by hot air through a conduit into which a mist of phenol/formaldehyde resin is introduced, the temperature, air flow and turbulence being such that the resin substantially cures without excessive agglomeration of fibers. Alternatively, fibers may be transported on a belt or other transportation device in an uncrimped state, sprayed with curable resin and dried at a temperature insufficient to cause the resin to cure. The fibers, now coated with dry, curable resin, are then crimped at a higher temperature at which the resin cures. Alternatively, the coated fibers are crimped at a low temperature at which the resin does not cure, and are subsequently cured in a heated chamber or conduit. Fibers which become partially agglomerated in any of these processes may be mechanically separated, preferably immediately after curing of the resin, or during resin cure. It is preferable that less than 20 weight percent of all natural fibers are permanently crimped natural fibers, more preferably less than 10 weight percent, and yet more preferably less than 5 weight percent.

The natural fibers may also include waste from textile processes where cloth, yarn, or thread of cotton, linen, wool, silk, etc., are used. Paper fibers and flakes may also constitute a portion of the total natural fiber, preferably not more than 30% by weight, more preferably less than 10% by weight, yet more preferably less than 5% by weight. It is preferable that 80-100%, more preferably 90-100% of the mulch natural fibers be wood fibers. In lieu of a large percentage of wood fibers, it is preferable that the natural fibers comprise wood fibers admixed with inexpensive natural fibers such as flax, sisal, jute, hemp, coconut, grass, straw, and the like. The most preferred natural fibers are conventional, non-crimped fibers, preferably wood fibers.

The synthetic fibers comprise bicomponent fibers having a high melt temperature core and a low melt temperature sheath. It is preferable that the core be polyester and the sheath be polyolefin, preferably polyethylene or polypropylene (including copolymeric polyethylene polymers and polypropylene polymers), and most preferably polyethylene homo- or co-polymers. While the terms "core" and "sheath" are used to describe the bicomponent fibers herein, these terms also include bicomponent fibers having an incomplete sheath, including bicomponent fibers where a strand of high melt temperature polymer abuts, continuously or discontinuously, a strand of low melt temperature polymer. The important consideration is that the bicomponent fiber be an integral fiber containing both polymers, regardless of physical arrangement, so long as the low temperature polymer is not completely surrounded or obscured by the high temperature polymer. By the term "high melt temperature" is meant a melt temperature such that the core of the fiber does not melt and thus lose its integrity under mat consolidation conditions. Some softening of the core is allowable. By "low melt temperature" is meant a temperature at which the sheath polymer softens and/or melts to the degree necessary to bind the natural fibers and other constituents of the mat together. The preferred bicomponent fibers are bicomponent fibers available from Leigh Fibers, having a low temperature sheath melting at about 110° C., and a core which melts at 500° F. (260° C.) or higher. However, other bicomponent fibers are commercially available and useful as well.

Core/sheath bicomponent fibers may be supplied with a concentric or eccentric core; the latter, as well as non-core/sheath bicomponent fibers, e.g. those having a side-by-side morphology, are useful in providing a product with greater loft while employing the same amounts of raw materials. Bicomponent fibers with polyester core and sheaths of polyethylene, linear low density polyethylene, and copolyester are available, as are also bicomponent fibers with a polypropylene core and polyethylene sheath. Bicomponent fibers with a polyamide core are also available. Copolyester sheaths generally have melting points in the range of 130° C. to 220° C., while polyethylene sheaths range from about 90° C. to 130° C. Polypropylene in core products generally melts at about 175° C., while polyester cores may melt from 200° C. to 250° C. or higher. Bicomponent polyamide fibers are also available with a polyamide 6,6 core (m.p. 260° C.) and polyamide 6 sheath (m.p. 220° C.). Core/sheath ratios of bicomponent fibers may range from 20:80 to 80:20 by weight, more preferably 60:40 to 40:60, and generally about 50:50.

The melting point of a sheath polymer or core polymer is dependent, of course, on its chemical makeup, and partially dependent on its molecular weight. Thus, lower molecular weight and to some degree oligomeric products tend to have lower melting points, while incorporation of comonomers, such as 1-butene and 1-octene in polyethylene, generally also lower the melting point. For "homopolyesters," polyethyleneterephthalate (PET) has a lower melting point than polyethylenenaphthalate (PEN). Many combinations are possible, and commercially available. Bicomponent fibers are also available from Fiber Innovation Technology, Inc., Johnson City, Ind., and ES Fibervisions, Inc., Athens, Ga. The bicomponent fibers comprise minimally 5 weight percent of the total weight of all synthetic fibers, preferably minimally 10 weight percent, more preferably minimally 15 weight percent, and may comprise any weight percentage up to 100 weight percent of total synthetic fibers, each percentage between 5 weight percent and 100 weight percent considered herein as individually disclosed. It is particularly preferred that the bicomponent fibers comprise from 60-100% of the total synthetic fiber content, more preferably 70-100%, yet more preferably 80-100%, and most preferably 90-100%. Most particularly, all synthetic fibers are bicomponent fibers.

The synthetic fiber component may also comprise conventional synthetic fibers other than bicomponent fibers. Such fibers may include fibers of relatively low melt temperature, i.e., which will soften appreciably and/or melt under mat consolidation temperatures, and those of relatively high melt temperature, i.e., which will remain integral under mat consolidation conditions. The terms "relatively" low and "relatively" high are used to describe the melt temperatures of the non-bicomponent fibers, since melting of these fibers is dependent upon the mat consolidation temperature which is in turn dependent upon the melting point of the low melt temperature portion of the bicomponent fibers. A "relatively low" melt temperature fiber will exhibit at least some appreciable softening and/or melting during consolidation, while "relatively high" melt temperature fibers will exhibit substantially no melting whatsoever. Thus, the relatively low melt temperature fibers may assist in mat bonding, with greater assistance in this respect as the consolidation temperature increases, while relatively high temperature fibers generally produce no increase in binding, but an increase in tensile strength of the mat due to these fibers retaining their integrity during consolidation.

Relatively low melt temperature fibers are preferably polyolefin homopolymers and copolymers, for example polyethylene fibers and polypropylene fibers, which are preferred. The relatively low melt synthetic fibers may comprise the remainder of the non-bicomponent fibers, but preferably constitute no more than 95% by weight of the total synthetic fiber content, more preferably less than 90% by weight, and most preferably about 85% by weight when both bicomponent and non-bicomponent fibers are employed.

Relatively high melt temperature fibers include high density polyethylene fibers, polyester fibers, polycarbonate fibers, polyamide fibers, rayon fibers, polyvinylalcohol fibers, polyvinylacetate fibers, polyacrylonitrile fibers, carbon fibers, and the like. Preferably, the relatively high melt temperature fibers are polyester fibers, particularly polyethylene terephthalate fibers, or polyamide fibers. The fibers may be virgin fibers, fibers obtained as recyclable products from textile and/or carpet manufacture, or any other source. The relatively high melt temperature fibers may be crimped, as disclosed in U.S. Pat. No. 5,779,782, herein incorporated by reference. The high melt temperature fibers may comprise up to 80 weight percent of total synthetic fibers, more preferably up to 60 weight percent, and most preferably from 0 weight percent to 50 weight percent, with each percentage from 0 weight percent to 80 weight percent considered as individually disclosed herein.

The synthetic fibers other than bicomponent fibers may have a denier of preferably from 2 to 64, more preferably 4 to 32 denier. Relatively high melt temperature synthetic fibers may range in length from ¼ inch (6 mm) to a length which is still practical for lay up of the mulch mat, e.g., up to about 8 inches (20 cm) in length, preferably no longer than about 4 inches (10 cm), and most preferably in the range of 1 inch (2.5 cm) to 3 inches (7.6 cm). Lengths of 2 to 3 inches (5.0 to 7.6 cm) have been found to be most useful. A mixture of fiber lengths may be used. Such mixtures are particularly useful when some long fibers, i.e., those between 4 inches (10 cm) and 8 inches (20 cm) are employed. A mixture of 10% by weight of fibers having lengths from 2 to 3 inches (50-76 mm) and 90% by weight in the range of ¼ inch (6 mm) to ¾ inch (19 mm) may be especially useful, as the longer fibers will aid in imparting greater tensile strength and tear strength, yet will be present in amounts such that traditional air- or water-laying fabrication techniques can be used. Preferably, the relatively high melt temperature synthetic fibers have lengths between ¼ inch (6 mm) and ¾ inch (19 mm).

The relatively low melt temperature fiber length is not as important as that of the high melt temperature fibers, as these fibers partially or substantially melt during the mat consolidation process. For purposes of ease of fabrication, it is desirable to avoid low melt temperature fibers of greater than 2 to 3 inches (25 mm-75 mm) length, as fabrication may be rendered more difficult. Preferred fiber lengths are as low as ⅛ inch (2 mm) or lower, particularly when the entire mat surface is to be melt-consolidated, but preferably range from ¼ inch (6 mm) to 3 inches (19 mm) in length, more preferably 1 to 2 inches (25 mm to 50 mm).

The bicomponent fibers are preferably supplied in lengths similar to those of the high melt temperature conventional synthetic fibers, and at deniers of from 2 to 64, preferably 4 to 32. Bicomponent fiber lengths of 2 to 3 inches (5.0 to 7.6 cm) with a denier of about 15 are particularly suitable.

Non-filamentary binders may be present in amounts of up to 20 percent by weight relative to the total weight of the mulch mat, preferably up to 10 percent by weight, and more preferably in the range of 0 to 5 percent by weight, each percentage between 0 and 20 being considered distinctly disclosed herein. By the term, "non-filamentary binders" is meant traditional powders or dispersions of natural or synthetic gums, resins, and the like which have heretofore been used in binding mat products, or which may be used in the future for such purposes. Preferably, non-filamentary binders are absent.

Preferred non-filamentary binders, when used, include starches such as corn starch, naturally occurring gums such as guar gum, gum tragacanth, and the like, and modified celluloses such as hydroxyalkyl celluloses and carboxyalkyl celluloses. Synthetic binders include a variety of polymers, particularly addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinylalcohol polymers, polyacrylate polymers, polyacrylic acid polymers, polyacrylamide polymers and their anionic- and cationic-modified copolymers, i.e., polyacrylamide-acrylic acid copolymers, and the like. Powdered polyethylene and polypropylene may also be used. When used, synthetic binders are preferably used in aqueous form, for example as solutions, emulsions, or dispersions.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available. Melamine/formaldehyde, urea/formaldehyde, urea/melamine/formaldehyde and like condensates may also serve as a slow release nitrogenous fertilizer.

Water absorbents may also be included, in amounts of up to 20 weight percent, preferably up to 15 weight percent, and more preferably from 0 to 10 weight percent based on the total mulch mat weight. Such absorbents or "super absorbents" are generally linear or crosslinked addition polymers of the polyacrylate or polyacrylamide type, and are commercially available. One such absorbent is Tackifier III, a polyacrylamide-based absorbent available from Profile Products, Inc., Chicago, Ill. Flocculants may also be included, in the same amounts.

Granulated fertilizer, powdered fertilizer, fertilizer prills, etc., may also be included, generally in amounts of less than 10% by weight relative to the total weight of the mulch mat, preferably less than 10% by weight. Grass or crop seed, including seeds of annuals or perennials may also be included, in amounts which correspond, preferably, to the desired areal seed distribution, or less than this desired distribution when seeds are to be sown as well. Pigments and dyestuffs may also be included, as well as any conventional additives employed in mulch mats to date.

The various ingredients may be premixed or supplied in the form of their individual components, by methods well known to those skilled in the art, for example by distribution in air followed by collection on a belt or foraminous screen. Methods of fabrication are disclosed in U.S. Pat. Nos. 5,330,828 and 5,302,445, which are herein incorporated by reference. The constituents may be deposited by water-laying methods as well, as in paper making machines, particularly when water soluble ingredients are avoided. Water-laying is particularly suitable when water soluble or dispersible binders are employed. These binders may also be sprayed onto an as-layered mat, or sprayed into the air stream conveying fiber components when air-laying is used. Once laid into a mat, the fibers may be carded, crosslapped, stitched, needled, or otherwise treated by conventional techniques used with non-woven materials.

Following preparation of the "as-layed" mat, the mat must be consolidated by heating to a temperature where the low melt temperature sheath polymer of the bicomponent fibers melt and bind the fibers together. Heating is generally conducted by infrared heating, for example using commercially available radiant panels, to a temperature sufficient to soften and/or fuse the low melting polymer sheath of the bicomponent fibers. Consolidation may also take place at modest pressure between heated rollers, as disclosed in U.S. Pat. Nos. 5,402,445 and 5,484,501, herein incorporated by reference. The gap between the rollers or "rolls" is adjusted to supply the desired amount of pressure and compaction, and is clearly dependent upon the initial unconsolidated mat thickness and the end product thickness desired. For example, for an initial unconsolidated thickness of form 0.5 inch (1.27 cm) to 0.75 inch (1.91 cm) thickness, a roll spacing of from 0.6 to 1.5 mm, preferably 0.7 mm to 1 mm may be used. It is preferable, however, that radiant heating be used to soften or fuse the low melting polymers, followed by compression between rollers maintained at a lower temperature. It is also possible to use other methods of consolidation, for example platens or continuous belts such as those supplied by Sandvik.

The mats may also be embossed during consolidation. Embossing takes place generally between pressured rollers or nips, at least one which has a pattern on the surface thereof, preferably at a point where the consolidating thermoplastic fibers are still in a softened or fused state. The embossing rolls and the process of embossing are as described in U.S. Pat. No. 5,330,828, herein incorporated by reference. The embossing/consolidation temperature is selected such that the bicomponent fiber sheaths melt to consolidate the mat, and low melt temperature synthetic fibers, if included, as least partially melt as well, but at a temperature where the core polymers of the bicomponent fibers and high melt temperature conventional fibers do not melt, or do not melt to the degree that their strength imparting properties are lost. This temperature may be achieved by preheating the mat, i.e. in an oven or with infrared energy, or by heated consolidation rollers or any combination, so long as the low temperature polymers, whether contained in conventional or bicomponent fibers, melt to the degree necessary to bind the mat constituents.

Figure 2:
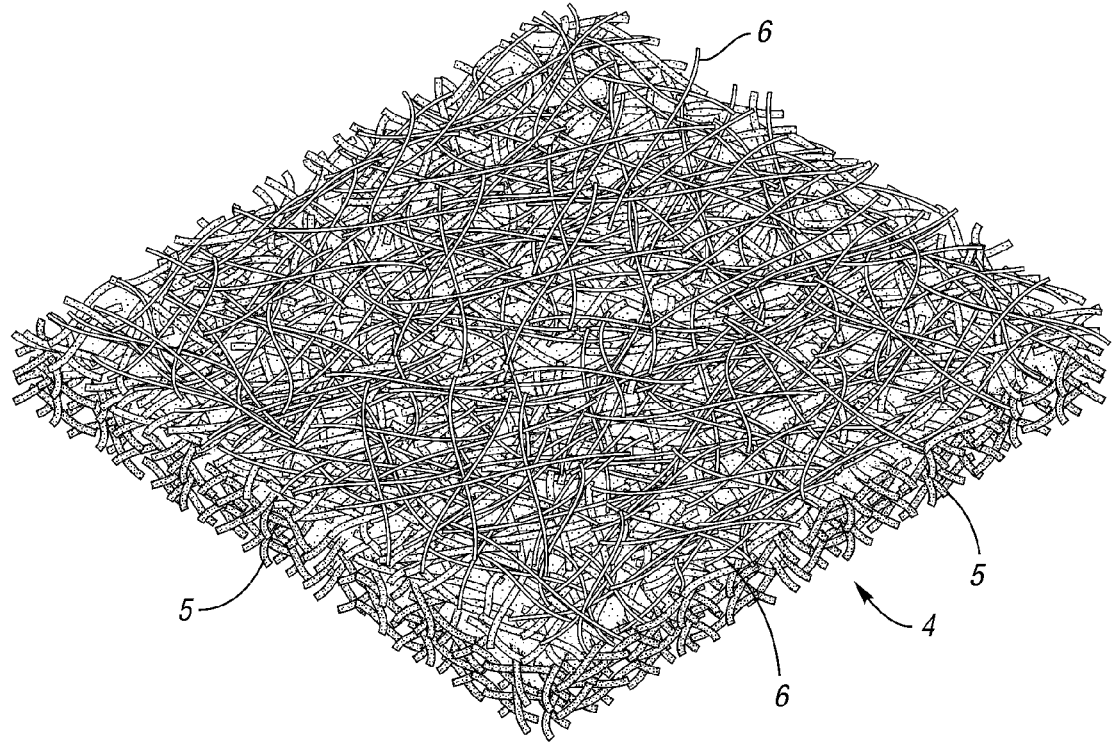
FIG. 2 illustrates one embodiment of a netless mulch mat in accordance with the present invention.

FIG. 2 illustrates in perspective a mat of the subject invention. The mat 4 consists of wood fibers 5 and synthetic fibers 6 in which this case are core/sheath bicomponent fibers. In further embodiments, the synthetic fibers may also include low melting or high melting synthetic fibers (not bicomponent fibers). However, bicomponent fibers must be present. The mat is consolidated where bicomponent fibers 6 and wood fibers 5 contact each other.

Figure 4:
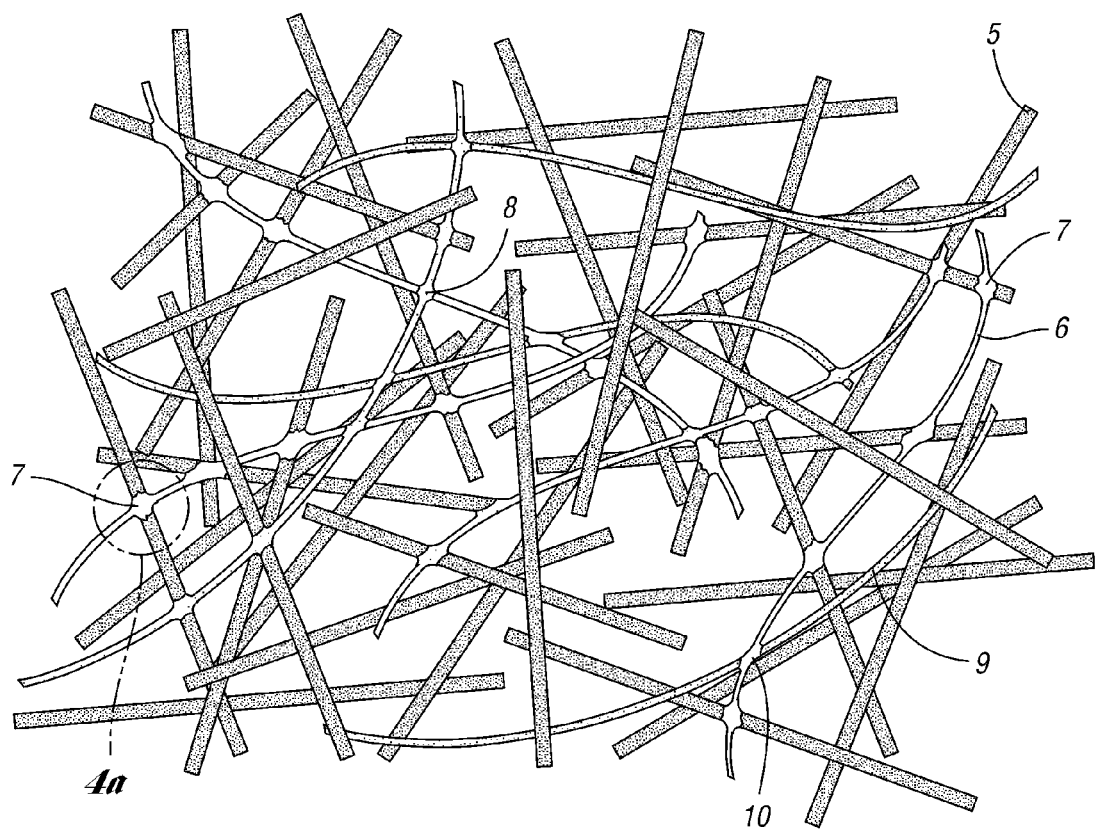
FIG. 4 illustrates binding of bicomponent fibers with natural fibers in one embodiment of the present invention.
Figure 4A:
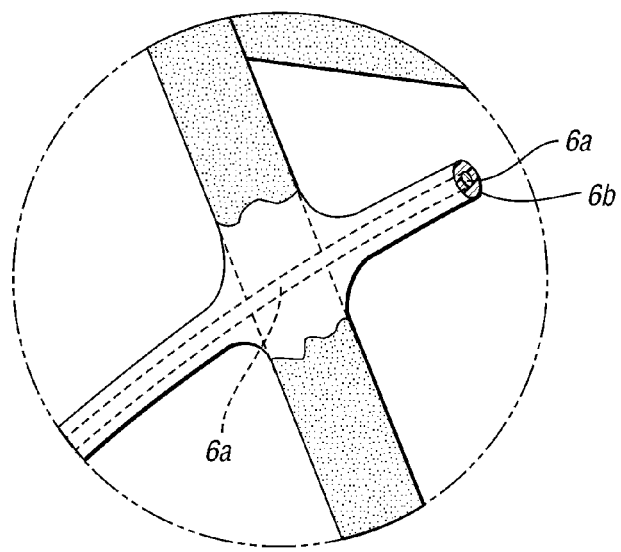
FIG. 4a illustrates an enlarged view of binding point 7 in FIG. 4.

The bonding of the bicomponent fibers is shown in enlarged views in FIGS. 4 and 4a. In FIG. 4, the bicomponent fibers 6 soften and/or melt and bond to the wood fibers 5 as shown at 7. An enlarged view of a bond site (FIG. 4a) shows that the core 6a of bicomponent fibers 6 retains its integrity, while the sheath 6b melts and bonds to wood fibers at 7, to other bicomponent fibers at 8, and to non-bicomponent synthetic fibers 9 at 10.

Figure 3:
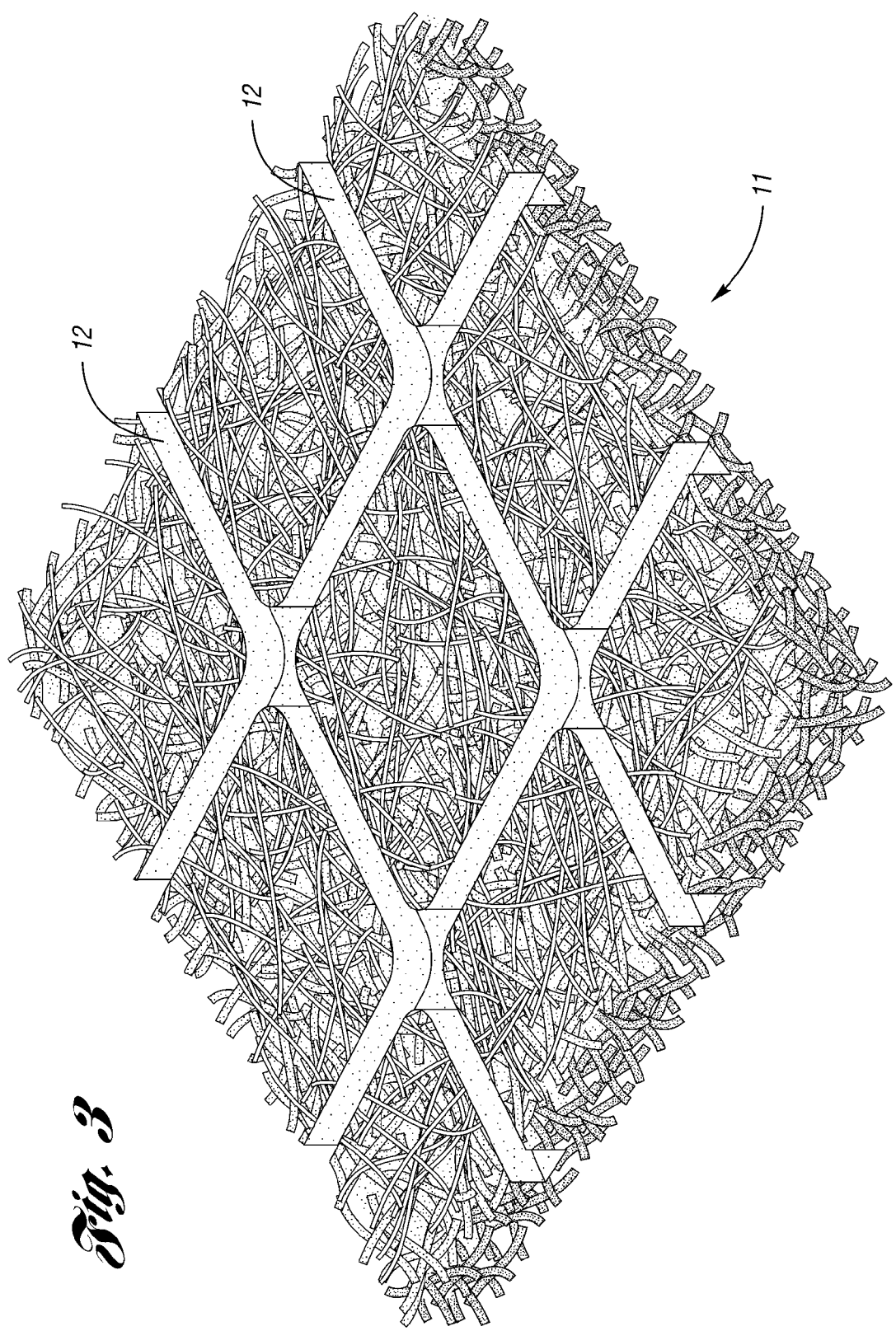
FIG. 3 illustrates a further embodiment of a netless mulch mat in accordance with the present invention.

FIG. 3 shows a preferred embodiment 11 of the subject invention mats of FIG. 2 which are embossed with a diamond pattern which causes the formation of depressed areas 12 in which bonding is more thorough.

Most preferably, the netless product is a diamond embossed product having from 7.2 to 10.5 weight percent, nominally 9 weight percent of bicomponent fibers with a polypropylene core and polyester sheath, and 92.8 to 89.5 weight percent, nominally 91% wood fibers, with an areal weight of 0.25 to 0.33 lbs/yd$^2$ (95 g/m$^2$ to 125 g/m$^2$), nominally 0.29 lbs/yd$^2$ (110 g/m$^2$), and a bicomponent fiber length of 2 to 3 inches (5 to 7.6 cm).

Example 1

A netless fiber mulch mat product is prepared by admixing in an air stream, 90 parts by weight of wood fibers prepared from pine and/or mixed wood species, 35% of which collect on a #8 sieve, and having an average length of about 0.75 inches (Profile Products thermally refined wood fiber), and 10% of synthetic fibers. The synthetic fibers constitute about 15% bicomponent staple fibers having a length of 2 inches (5 cm) and a polyester core and polyethylene sheath, available from Leigh Fibers, and about 85% polypropylene staple fibers, 1.5 inches average length, from Synthetic Industries, supplied separately. The fibers are deposited on a moving fiberglass belt of 96 inch (2.44 m) width in a thickness of about 0.62 inch and at a nonimal width of about 84 inches (2.13 m) and are preliminarily heated under a set of radiant panels which provide a strong surface bond to the bicomponent and polypropylene fibers, and then pass through two heated rollers having a length of 100 inches (2.54 m) and diameter of 18 inches (0.46 m), both rollers heated to a surface temperature of 300° F. (149° C.), maintained at a spacing of approximately 0.75 to 1 mm. The mat passes through the rollers at a lineal speed of approximately 80 to 120 ft/min (24.4 to 36.6 m/min). One roller contains a diamond pattern ¼ inch (6 mm) deep which creates a mat having an embossed diamond grid pattern thereon. The diamonds in the diamond pattern measure about 4¾ inches (121 mm) long (apex to apex) and 2⅞ inches (72 mm) high. The raised lands which from the diamond interior have a width of about ¼ inch (6 mm). The mat is consolidated to a mulch mat product which is drapeable but yet which exhibits good tensile and tear strength, the embossed grid portions having a nominal thickness of 1.55 mm, and the non-grid portions having a thickness of approximately 5 mm. The strength of the mat is compared with a mat similar to a commercial polymer netting-containing mat prepared employing a conventional polymer binder, but specially prepared without the polymer netting for comparison purposes. The mat of the present invention is considerably stronger than the comparative product, and exhibits a water holding capacity increase of about 25% as compared to the commercial product manufactured with polymer netting.

Example 2

In a manner similar to Example 1, a netless product is prepared from a batt of 91% classified pine wood fibers, 32.5-40% of which collect on a standard ASTM #8 sieve, and 9% of bicomponent fibers with a polyester core and polyolefin sheath with a sheath melting temperature of 110° C., average lengths between 2-3 inches (5-7.6 cm), and a denier of 15. The batt is consolidated as in Example 1 to a finished product which is diamond embossed and has a nominal areal weight of 0.29 lbs/yd$^2$ (110 g/m$^2$).

Prior to consolidation, the mat, slightly greater than ⅜ inch (9.5 mm) in thickness, is heated by radiant heating. The batt surface temperature is initially becomes 275° F. (135° C.) and as the batt traverses below the radiant heat panels, the temperature increases to about 420° F. (216° C.) at the end of the heating cycle. No heat is applied for about 4 seconds as the traveling batt continues towards the consolidating rollers. The rollers are maintained a distance apart so as to produce modest compression and to obtain a product, after spring-back following compression, of about ⅜" (9.5 mm) in non-embossed areas. The bottom roller is smooth and is maintained at 300° F. (149° C.), while the top roller has a diamond pattern as previously described and is maintained at 325° F. (163° C.). Following exit from the rollers, the product is allowed to cool, and is then rolled and packaged for shipment. The thickness of non-embossed areas is nominally ⅜ inch (9.5 mm) thick, while the embossed and more highly consolidated areas are nominally ⅛ inch (3 mm) thick. The product contains no net, is drapeable, and exhibits good tear resistance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A thermally consolidated fiber mulch mat, comprising:
   a) in excess of from 50% by weight, relative to the weight of the fiber mulch mat, of natural fibers;
   b) about 3 to about 30% by weight, relative to the weight of the fiber mulch mat, of synthetic fibers, at least a portion of the synthetic fibers being bicomponent fibers comprising a core of high melt temperature synthetic polymer and a sheath of low melt temperature synthetic polymer in the bicomponent fibers,
   the fiber mulch mat being of an open construction which encourages germination of seeds and allows seedlings to penetrate the mat, the fiber mulch mat being free of polymer netting, wherein the bicomponent fibers comprise a polyester core, and a sheath of polyolefin, or a polyester having a lower melting point than the polyester core.

2. The thermally consolidated fiber mulch mat of claim 1, wherein the bicomponent fibers contain the polyester core and the sheath of polyolefin.

3. The thermally consolidated fiber mulch mat of claim 1, wherein the bicomponent fibers have the core of polyester and the sheath of the lower melt temperature polyester.

4. The thermally consolidated fiber mulch mat of claim 1, wherein the natural fibers are wood fibers, flax fibers, sisal fibers, jute fibers, hemp fibers, coconut fibers, grass, straw, or mixtures thereof.

5. The thermally consolidated fiber mulch mat of claim 1, wherein the natural fibers comprise thermo-mechanically produced wood fibers.

6. The thermally consolidated fiber mulch mat of claim 1, wherein the natural fibers comprise wood fibers, and not more than 30% by weight, relative to the total weight of wood fibers, of paper fibers, paper flakes, or a mixture thereof.

7. The thermally consolidated fiber mulch mat of claim 1, comprising from 70 to 95 weight percent of natural fibers, based on the weight of the fiber mulch mat, and from 3% to about 30% of synthetic fibers.

8. The thermally consolidated fiber mulch mat of claim 1, comprising from 75 to 95 weight percent natural fibers and from 5 to 25 weight percent of synthetic fibers.

9. The thermally consolidated fiber mulch mat of claim 8, wherein from 80 to 100% by weight of the natural fibers are thermo-mechanically processed wood fibers.

10. The thermally consolidated fiber mulch mat of claim 1, wherein a portion of the natural fibers are crimped natural fibers.

11. The thermally consolidated fiber mulch mat of claim 1, further comprising high melting point non-bicomponent fibers as a portion of the synthetic fibers.

12. The thermally consolidated fiber mulch mat of claim 1, which is devoid of polymer netting.

13. The thermally consolidated fiber mulch mat of claim 1, wherein the synthetic fibers comprise minimally 5 weight percent of bicomponent fibers, based on the total weight of synthetic fibers.

14. The thermally consolidated fiber mulch mat of claim 1, wherein the synthetic fibers comprise minimally 10 weight percent of bicomponent fibers, based on the total weight of synthetic fibers.

15. The thermally consolidated fiber mulch mat of claim 1, further comprising at least one of c) a non-filamentary binder in an amount of up to 20 weight percent based on the weight of the thermally consolidated fiber mulch mat, d) up to 20 weight percent based on the weight of the thermally consolidated fiber mulch mat of one or more water absorbent polymers; e) up to 10% by weight of fertilizer, or f) grass or crop seed.

16. The thermally consolidated fiber mulch mat of claim 1, wherein the natural fibers comprise wood fibers with number average lengths of from 6 mm to 19 mm.

17. The thermally consolidated fiber mulch mat of claim 1, having a thickness of from about 3 mm to about 9.5 mm.

18. The thermally consolidated fiber mulch mat of claim 17, having an areal weight of from 95 g/m$^2$ to 125 g/m$^2$.

19. A process for establishing germination in a seed bed, comprising applying a thermally consolidated fiber mulch mat of claim 1 over the seed bed, and allowing seedlings to penetrate the thermally consolidated fiber mulch mat.

20. A process for establishing germination in a seed bed, comprising applying a thermally consolidated fiber mulch mat of claim 17 over the seed bed, and allowing seedlings to penetrate the thermally consolidated fiber mulch mat.

* * * * *

UNITED STATES PATENT AND TRADEMARK OFFICE
CERTIFICATE OF CORRECTION

PATENT NO. : 9,936,651 B2
APPLICATION NO. : 13/926114
DATED : April 10, 2018
INVENTOR(S) : Kevin Scott Spittle et al.

Page 1 of 1

It is certified that error appears in the above-identified patent and that said Letters Patent is hereby corrected as shown below:

In the Claims

Column 11, Lines 57-59, Claim 1:
After "and a sheath of polyolefin,"
Delete "or a polyester having a lower melting point than the polyester core." and
Insert -- or a sheath of a lower melt temperature polyester --.

Column 12, Line 62, Claim 20:
After "thermally consolidated fiber mulch mat of claim"
Delete "17" and
Insert -- 7 --.

Signed and Sealed this
Second Day of October, 2018

Andrei Iancu
*Director of the United States Patent and Trademark Office*